United States Patent
Shaull et al.

(10) Patent No.: US 10,927,739 B2
(45) Date of Patent: Feb. 23, 2021

(54) INJECTOR INCLUDING SWIRL DEVICE

(71) Applicant: Cummins Emission Solutions Inc., Columbus, IN (US)

(72) Inventors: Anthony A. Shaull, Columbus, IN (US); Bradlee J. Stroia, West Granby, CT (US); Stephen M. Holl, Columbus, IN (US); Richard Davis Thomas, North Vernon, IN (US); Michael Hays, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 222 days.

(21) Appl. No.: 15/846,860

(22) Filed: Dec. 19, 2017

(65) Prior Publication Data

US 2018/0179938 A1 Jun. 28, 2018

Related U.S. Application Data

(60) Provisional application No. 62/438,719, filed on Dec. 23, 2016.

(51) Int. Cl.
| | |
|---|---|
| *F02M 61/00* | (2006.01) |
| *F02M 61/16* | (2006.01) |
| *F02M 51/06* | (2006.01) |
| *F01N 3/20* | (2006.01) |
| *F01N 3/28* | (2006.01) |
| *F02M 61/04* | (2006.01) |

(52) U.S. Cl.
CPC ......... *F01N 3/2066* (2013.01); *F01N 3/2892* (2013.01); *F02M 61/00* (2013.01); *F02M 61/162* (2013.01); *F01N 2610/02* (2013.01); *F01N 2610/1453* (2013.01); *F02M 51/0682* (2013.01); *F02M 61/042* (2013.01); *Y02T 10/12* (2013.01)

(58) Field of Classification Search
CPC .. F01N 3/2066; F01N 3/2892; F01N 2610/02; F01N 2610/1453; F02M 61/162; F02M 61/042; F02M 61/045; F02M 47/025; F02M 51/0682
USPC ........................................................ 239/463
See application file for complete search history.

(56) References Cited

U.S. PATENT DOCUMENTS

| | | | | |
|---|---|---|---|---|
| 3,387,790 | A | * 6/1968 | De Luca ................ | F02M 61/10 239/453 |
| 3,985,301 | A | * 10/1976 | Tindall .................. | B05B 1/3046 239/126 |
| 4,179,069 | A | * 12/1979 | Knapp ............... | F02M 51/0678 239/125 |

(Continued)

*Primary Examiner* — Joseph A Greenlund
(74) *Attorney, Agent, or Firm* — Foley & Lardner LLP

(57) ABSTRACT

An injector includes a needle and a body. The needle is configured to receive fluid from a fluid supply and operable between a first position, in which the fluid is not provided to a target, and a second position, in which the fluid is provided to the target. The needle includes a first needle bore, a second needle bore, and a first connector. The first needle bore is configured to receive fluid from the fluid supply. The second needle bore is aligned with the first needle bore and configured to provide fluid to the fluid supply. The first connector is in fluid communication with the second needle bore. The body includes an end, a first body bore, and a second body bore. The first body bore is configured to receive the needle. The second body bore is positioned to be contiguous with the end.

17 Claims, 13 Drawing Sheets

(56) References Cited

U.S. PATENT DOCUMENTS

| | | | | |
|---|---|---|---|---|
| 4,195,783 A * | 4/1980 | Hulsing | ............... | F02M 61/045 239/533.3 |
| 4,292,947 A * | 10/1981 | Tanasawa | ............ | F02M 51/0682 123/445 |
| 4,423,715 A * | 1/1984 | Ecomard | ............... | F02M 59/361 123/501 |
| 4,494,700 A * | 1/1985 | Dolenc | ................... | F02M 61/18 239/533.3 |
| 4,658,824 A * | 4/1987 | Scheibe | ................. | F02M 61/18 123/446 |
| 4,758,169 A * | 7/1988 | Steiger | ................... | F02M 45/08 239/446 |
| 4,805,837 A | 2/1989 | Brooks et al. | | |
| 4,869,429 A * | 9/1989 | Brooks | ................... | F02M 61/16 239/473 |
| 4,909,444 A * | 3/1990 | Sczomak | ............. | F02M 61/045 239/453 |
| 5,275,337 A * | 1/1994 | Kolarik | ................... | F02M 57/02 137/853 |
| 5,421,521 A | 6/1995 | Gibson et al. | | |
| 5,647,536 A * | 7/1997 | Yen | ......................... | F02M 45/10 239/124 |
| 5,676,114 A * | 10/1997 | Tarr | ....................... | F02M 47/027 123/446 |
| 5,765,755 A * | 6/1998 | Peters | .................... | F02M 45/10 239/124 |
| 5,769,319 A | 6/1998 | Yen et al. | | |
| 5,899,385 A * | 5/1999 | Hofmann | ............... | F02M 61/16 239/124 |
| 6,065,692 A * | 5/2000 | Brinn, Jr. | ............. | F02M 51/0671 239/463 |
| 6,296,199 B1 * | 10/2001 | Noller | ................ | F02M 51/0671 239/533.12 |
| 6,382,533 B1 * | 5/2002 | Mueller | ............... | F02M 61/162 239/585.1 |
| 6,467,702 B1 * | 10/2002 | Lambert | ............. | F02M 45/086 239/533.12 |
| 6,764,028 B2 * | 7/2004 | Mills | ................... | F02M 51/0682 239/533.3 |
| 6,769,635 B2 * | 8/2004 | Stewart | ................... | F02M 45/02 123/299 |
| 6,918,550 B2 * | 7/2005 | Luft | ...................... | F02M 61/168 239/585.1 |
| 7,032,846 B1 | 4/2006 | Heyse | | |
| 7,090,145 B2 | 8/2006 | Baker et al. | | |
| 7,343,895 B2 | 3/2008 | Mark | | |
| 7,467,749 B2 * | 12/2008 | Tarabulski | ............. | F01N 3/208 239/5 |
| 7,784,716 B2 * | 8/2010 | Fukutomi | ............... | F02M 61/18 239/533.12 |
| 8,047,452 B2 * | 11/2011 | Martin | ................... | F01N 3/2066 239/5 |
| 8,322,325 B2 | 12/2012 | Rogak et al. | | |
| 8,523,089 B2 * | 9/2013 | Bamber | ................ | B05B 1/3452 239/585.1 |
| 9,103,311 B2 * | 8/2015 | Yasukawa | ........... | F02M 61/1806 |
| 9,291,139 B2 * | 3/2016 | Hicks | ................... | F02M 61/162 |
| 10,550,811 B2 * | 2/2020 | Flarup | ..................... | F02M 61/10 |
| 2004/0211846 A1 * | 10/2004 | Chenanda | ............. | F02M 55/002 239/132.5 |
| 2005/0072865 A1 * | 4/2005 | Goto | ..................... | F02M 61/042 239/585.1 |
| 2006/0086825 A1 * | 4/2006 | Date | ................... | F02M 21/0263 239/408 |
| 2006/0124771 A1 * | 6/2006 | Catasus-Servia | ..... | F02M 61/042 239/533.12 |
| 2006/0231647 A1 * | 10/2006 | Hohl | .................... | F02M 61/042 239/585.1 |
| 2006/0236974 A1 * | 10/2006 | Randall | ................... | F02M 61/18 123/299 |
| 2007/0044767 A1 * | 3/2007 | Kojima | ............... | F02M 63/0225 123/470 |
| 2008/0006712 A1 * | 1/2008 | Benson | ............... | F02M 63/0022 239/5 |
| 2009/0020631 A1 * | 1/2009 | Mashida | ............. | F02D 19/0678 239/533.3 |
| 2010/0199948 A1 * | 8/2010 | Rogak | ................... | F02D 19/061 123/304 |
| 2011/0232606 A1 * | 9/2011 | Peters | ................. | F02M 61/1806 123/445 |
| 2011/0253809 A1 * | 10/2011 | Bamber | ................. | B05B 1/3436 239/518 |
| 2012/0012681 A1 * | 1/2012 | Peters | ................... | F02M 61/042 239/533.2 |
| 2013/0200174 A1 * | 8/2013 | Jeon | ........................ | F02M 61/10 239/66 |
| 2013/0213358 A1 * | 8/2013 | Hou | ..................... | F02D 19/0694 123/445 |
| 2013/0299604 A1 * | 11/2013 | Thomas | ..................... | F01N 3/28 239/125 |
| 2014/0083397 A1 * | 3/2014 | Huettner | ............ | F02M 51/0617 123/527 |
| 2014/0116032 A1 * | 5/2014 | Yetkin | ................... | F01N 3/2066 60/295 |
| 2014/0373806 A1 * | 12/2014 | Hou | ........................ | F02M 26/19 123/294 |
| 2015/0060576 A1 * | 3/2015 | Nonoyama | ........ | F02M 61/1893 239/585.4 |
| 2016/0003206 A1 * | 1/2016 | Maragliulo | ........ | F02M 63/0026 239/584 |
| 2018/0179938 A1 * | 6/2018 | Shaull | ................... | F01N 3/2892 |

* cited by examiner

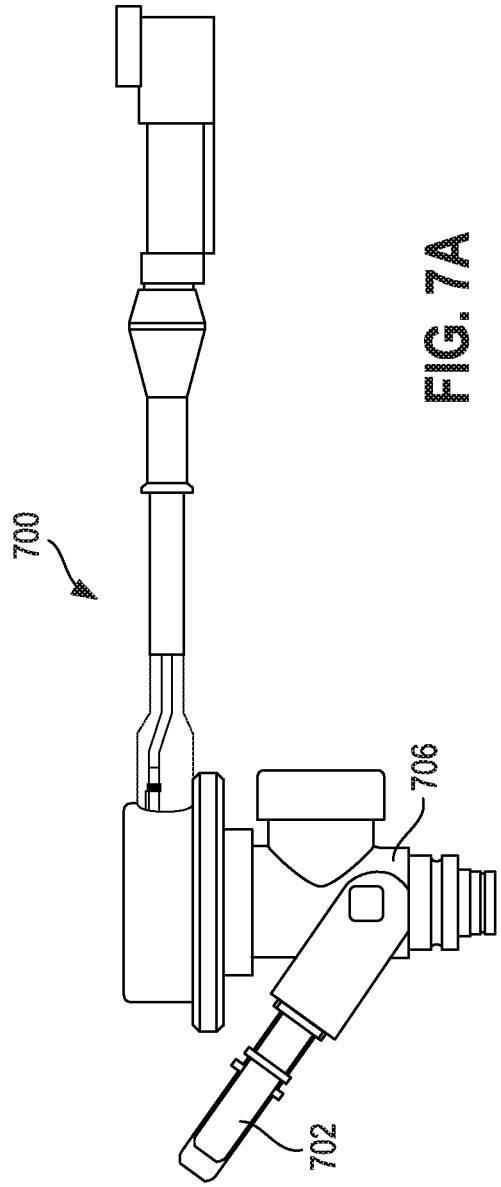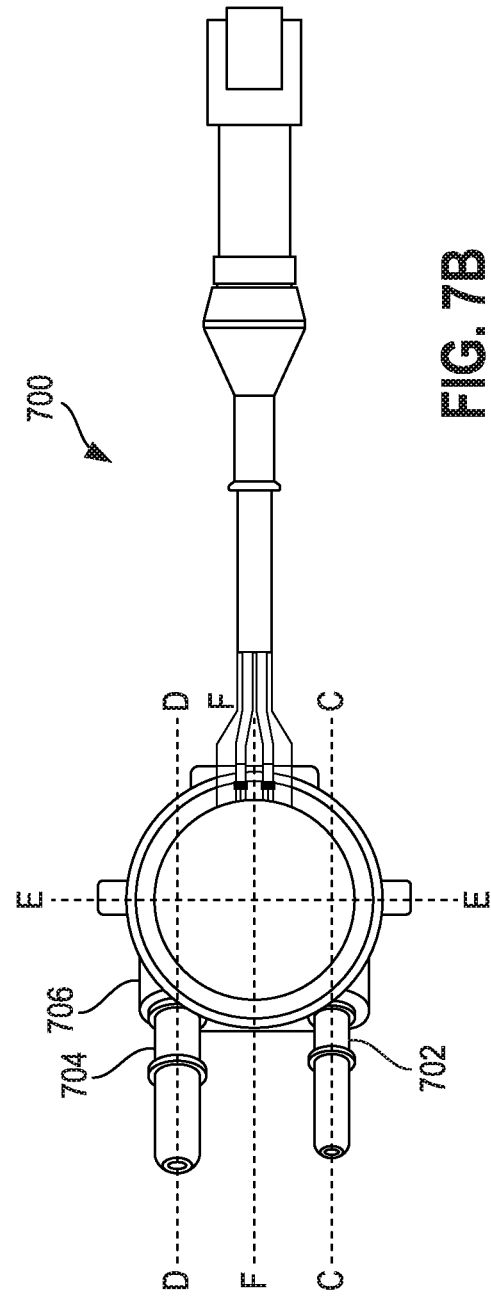

US 10,927,739 B2

INJECTOR INCLUDING SWIRL DEVICE

CROSS-REFERENCE TO RELATED APPLICATION

This application claims the benefit of and priority to U.S. Provisional Patent Application No. 62/438,719, filed on Dec. 23, 2016, the contents of which are incorporated herein by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a Selective Catalytic Reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or aqueous urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

One implementation relates to an injector that includes a needle and a body. The needle is configured to receive fluid from a fluid supply and operable between a first position, in which the fluid is not provided to a target, and a second position, in which the fluid is provided to the target. The needle includes a first needle bore, a second needle bore, and a first connector. The first needle bore is configured to receive fluid from the fluid supply. The second needle bore is aligned with the first needle bore and configured to provide fluid to the fluid supply. The first connector is in fluid communication with the second needle bore. The body includes an end, a first body bore, and a second body bore. The first body bore is configured to receive the needle. The second body bore is positioned to be contiguous with the end.

Another implementation relates to an injector that includes an outer shell and a swirl device. The outer shell includes an inlet port, an outlet port, a first outer shell bore, a second outer shell bore, and a third outer shell bore. The inlet port is configured to receive fluid from a fluid supply. The outlet port is configured to provide fluid to the fluid supply. The first outer shell bore is in fluid communication with the inlet port and the outlet port. The first outer shell bore has a first end and a second end. The second outer shell bore is in fluid communication with the first outer shell bore. The second outer shell bore is aligned with the first outer shell bore and in confronting relation with the first end of the first outer shell bore. The third outer shell bore is in fluid communication with the first outer shell bore. The third outer shell bore is aligned with the first outer shell bore and in confronting relation with the second end of the first outer shell bore. The swirl device is positioned in the third outer shell bore and the first outer shell bore. The swirl device is configured to receive the fluid from the inlet port and to provide the fluid to the first outer shell bore after charging the fluid with rotational energy.

Still another implementation relates to an injector that includes an outer shell, a swirl device, and a plunger. The outer shell includes an inlet port, an outlet port, and a first outer shell bore. The inlet port is configured to receive fluid from a fluid supply. The outlet port is configured to provide fluid to the fluid supply. The first outer shell bore is in fluid communication with the inlet port and the outlet port. The first outer shell bore has a first end and a second end. The swirl device is positioned in the outer shell. The swirl device is configured to receive the fluid from the inlet port and to provide the fluid to the first outer shell bore after charging the fluid with rotational energy. The swirl device includes a central opening. The central opening is configured to selectively facilitate flow of the fluid from the swirl device to the first outer shell bore. The plunger is slidably received within the central opening of the swirl device such that the plunger is configured to selectively prevent flow of the fluid from the swirl device into the first outer shell bore.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 7A is a side view of another injector;

FIG. 7B is a top view of the injector shown in FIG. 7A;

Figure 1:
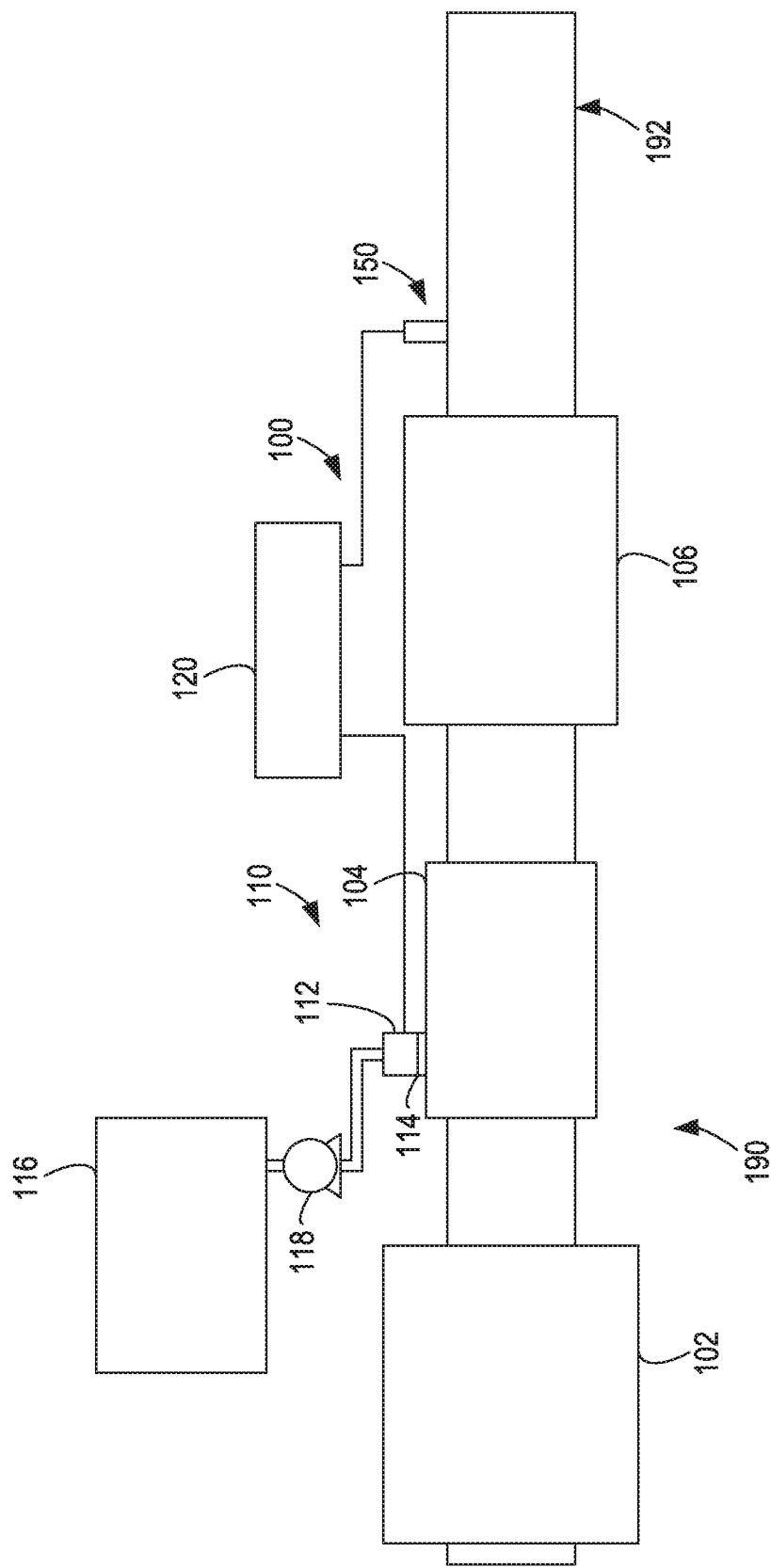
FIG. 1 is a block schematic diagram of an example selective catalytic reduction system having an example reductant delivery system for an exhaust system.
Figure 2:
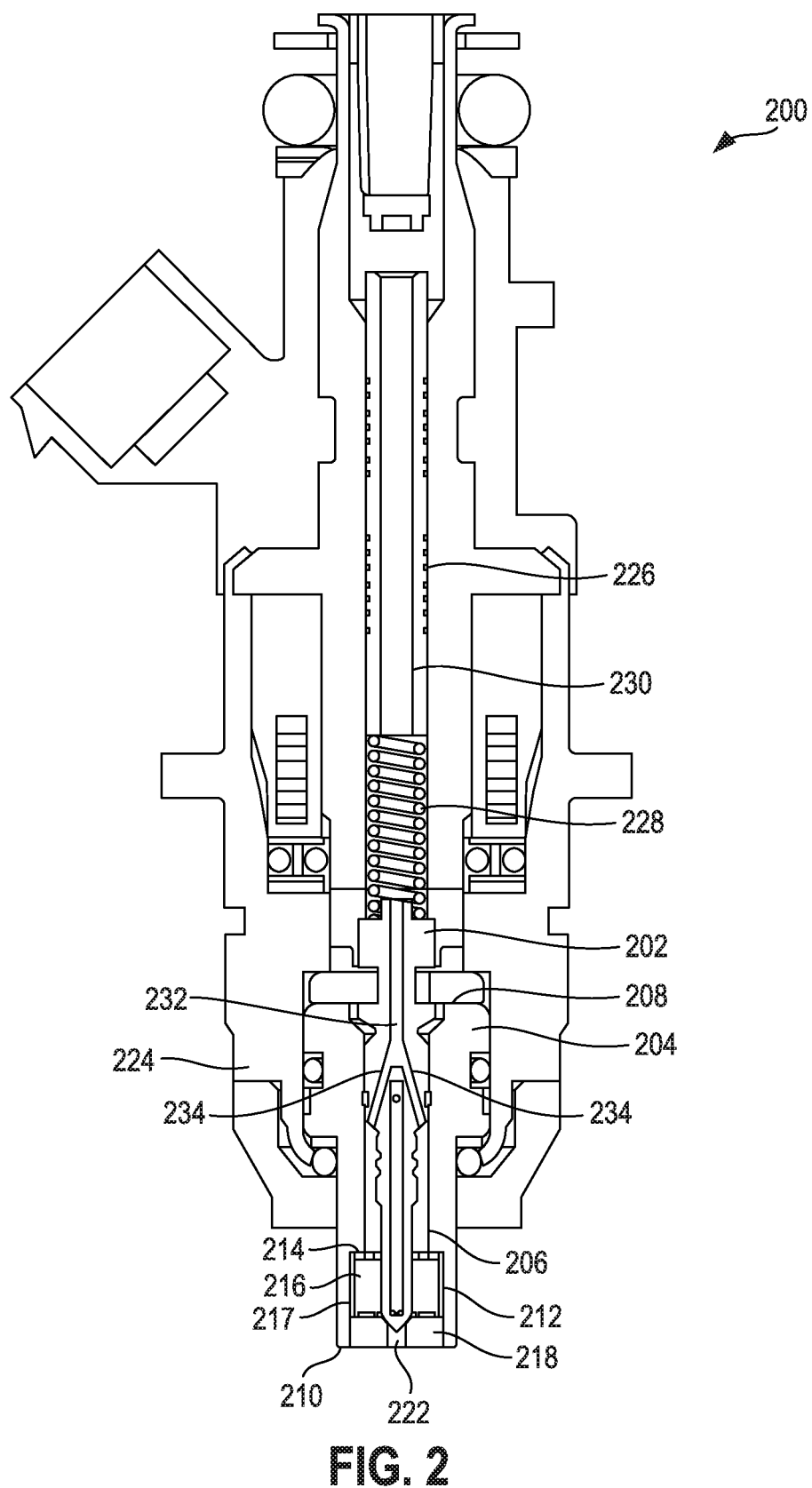
FIG. 2 is a cross-sectional view of an injector.
Figure 3:
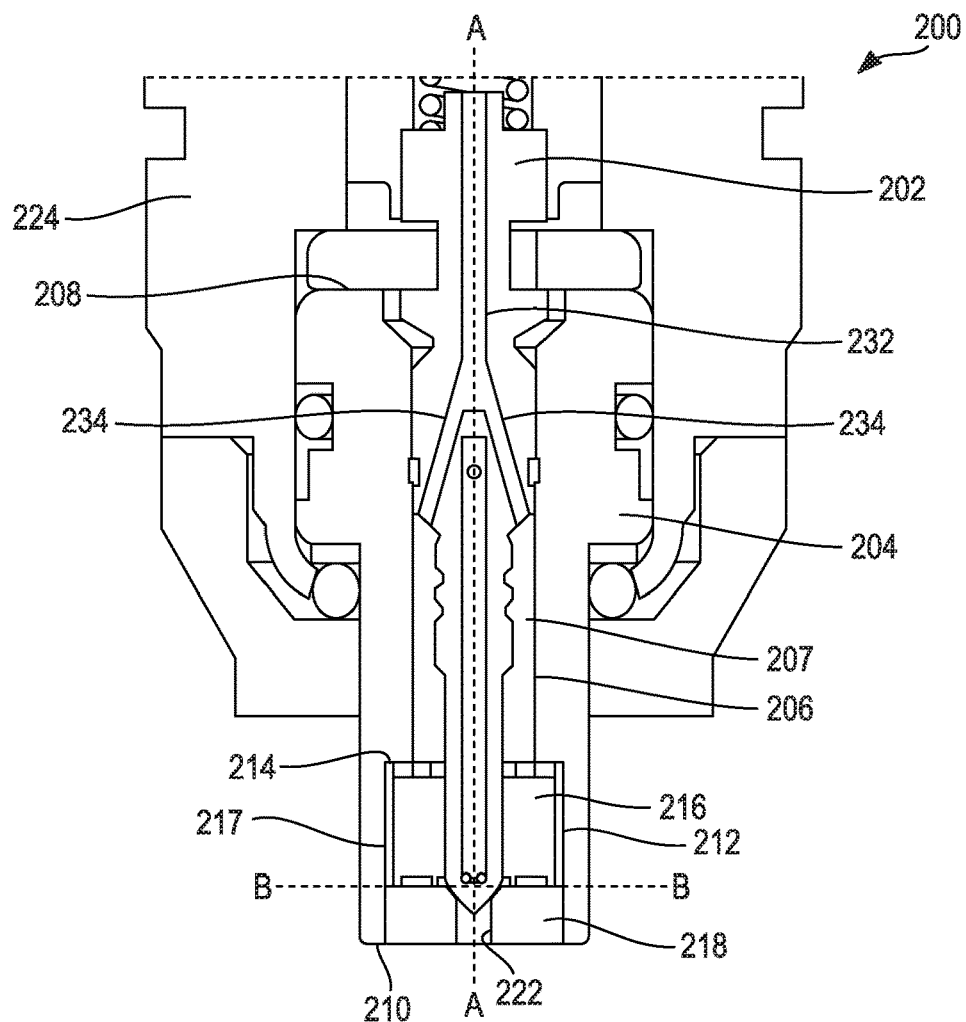
FIG. 3 is a detailed view of the injector shown in FIG. 2.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for an injector including a swirl device. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Injectors are utilized in various components associated with internal combustion engines. For example, injectors may be implemented for injecting fuel into a combustion chamber (e.g., cylinder, etc.) in an internal combustion engine (e.g., port fuel injectors (PFI), gasoline direct injectors (GDI), etc.). Injectors may also be implemented for injecting water into, for example, incoming air or fuel-air mixtures, or directly into a combustion chamber (e.g., anti-detonant injector (ADI), etc.). In diesel internal combustion applications, injectors may be implemented for injecting diesel exhaust fluid (DEF) in SCR systems.

In many mobile SCR systems, a liquid reductant such as an aqueous urea solution (DEF) is injected upstream of an SCR catalyst. Liquid reductant droplets then undergo the processes of evaporation, thermolysis, and hydrolysis to form gaseous ammonia which helps to chemically reduce the harmful oxides of nitrogen present in engine exhaust to less harmful compounds. SCR catalysts are employed to carry out the $NO_x$ reduction process. The present disclosure is related to design of a liquid reductant injector nozzle that produces a well-atomized spray with high part-to-part and cycle-to-cycle repeatability when a prescribed pressure differential is applied.

In some instances, liquid reductant injector nozzles have only straight sections, meaning that the diameter of the section is constant from upstream to downstream. Nozzles with only straight sections, however, do not accelerate the liquid to enhance primary atomization. Furthermore, the absence of enough static chambers causes spray asymmetry due to the angled momentum of the liquid being discharged. In other instances, liquid reductant injector nozzles have diverging sections upstream of the discharge orifice. Nozzles with diverging sections upstream of the discharge orifice, however, create an unfavorable pressure gradient, leading to the lowering of the pressure differential that drives atomization. Furthermore, these nozzles may create recirculation zones, leading to spray impingement on walls and subsequent solid deposit formation and increased part-to-part or cycle-to-cycle variability.

Implementations described herein relate to a liquid reductant injector nozzle with a converging section, meaning that the diameter of the section is smaller downstream than it is upstream. The liquid reductant injector nozzle described herein is capable of introducing a liquid reductant into a stream of exhaust gases containing pollutants so as to produce a well-atomized spray with high part-to-part and cycle-to-cycle repeatability when a prescribed pressure differential is applied. This capability significantly improves the spray parameters and, therefore, $deNO_x$ efficiency of SCR systems, concurrently reducing chances of forming solid deposits and maintaining sufficient mechanical strength to withstand the pressure increase from solidification or freezing of the liquid reductant when it is exposed to low temperatures.

In various implementations, an injector is provided that includes a swirl device (e.g., swirl plate, etc.). The swirl device imparts rotational energy on fluid within the injector. The rotational energy may advantageously reduce a droplet size of fluid in the injector. This reduction has a significant impact on performance of the injector at the start of injection, where large droplet sizes are common in conventional injectors. Additionally, the injector may provide for the shut-off of flow to a drain when the injector is providing fluid to a target. In this way, a pumping quantity requirement is reduced and, correspondingly, a pump size requirement is reduced. The rotational energy provided by the swirl device is continuous because the fluid flows from the fluid supply to the drain or to the target continuously. Further, the rotational energy provided by the swirl device may provide cooling to a tip of the injector. This cooling may be particularly advantageous in diesel exhaust fluid applications.

Following an exemplary operation, for the systems shown in FIGS. 9, 11, and 13-16, for example, fluid is introduced into injector 700 through inlet fitting 702 and then through inlet port 708. From inlet port 708, fluid flows into inlet passage 712 where the fluid is introduced to inlet bore 716 (also referred to as a third outer shell bore). Fluid flows into annular step 1002 and down into collectors 1004, between exterior surface 1000 of swirl insert 726 and recess 728 of swirl plate 724. From collectors 1004, fluid is directed through runners 1006 to ring 1008. Once in ring 1008, fluid is located proximate to head 1206 of plunger 732. When plunger 732 is in the first position, as determined through the electromagnetic force exerted on armature 736 which is transferred through connecting element 734 to plunger 732, the fluid is blocked from entering aperture 1100 and thus cannot be transmitted to the target through nozzle 1108. Rather, the fluid flows from ring 1008, between head 1206 and enlarged opening 1110, and around plunger 732 by flowing between central opening 730 and flats 1204. Next, while plunger 732 is in the first position, the fluid flows between connecting element 734 and central bore 718 (also referred to as a first outer shell bore) until the fluid reaches outlet bore 720 (also referred to as a second outer shell bore). From outlet bore 720, the fluid is directed through outlet passage 714 to outlet port 710 and then to outlet fitting 704 where the fluid is provided to, for example, the fluid supply.

Still following the exemplary operation, if plunger 732 is in the second position, as determined through the electromagnetic force exerted on armature 736 which is transferred through connecting element 734 to plunger 732, the fluid is no longer blocked from entering aperture 1100. The fluid flows from ring 1008 to aperture 1100 via receiver 1102. From aperture 1100 the fluid flows into nozzle 1108 where the fluid is dispersed to the target. Fluid is prevented from flowing to outlet fitting 704 when plunger 732 is in the second position through a seal created between interface surface 1208 and annular surface 1112. When in the second position, pressure may be created within injector 700 because of the seal created between interface surface 1208 and annular surface 1112. This pressure may propel the fluid to outlet fitting 704. Because the fluid has a constant flow path, either to the fluid supply, when plunger 732 is in the first position, or to the target, when plunger 732 is in the second position, rotational energy (e.g., swirl, etc.) created by swirl device 722 is continuous.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or diesel exhaust fluid (DEF), into ammonia. The decomposition chamber 104 includes a reductant delivery system 110 having a doser or dosing module 112 configured to dose the reductant into the decomposition chamber 104 (for example, via an injector such as the injector described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, as a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. First Example Injector

FIGS. 2-6 depict an injector 200, according to an exemplary embodiment. Injector 200 is configured to selectively control the flow of fluid (e.g., DEF, fuel, water, etc.) from a fluid supply (e.g., fluid reservoir, fluid line, manifold, pump, etc.) to a target (e.g., decomposition chamber 104, cylinder, cylinder head, etc.). For example, injector 200 may be a commercially available off-the-shelf (COTS) injector (e.g., a Mitsubishi injector, etc.) that has been modified. The fluid supply may be pressurized. For example, in various embodiments the fluid supply is pressurized to between five and two-hundred bar.

Injector 200 includes, among other components, a needle 202 and a body 204. Needle 202 may be configured based on body 204 and vice versa. According to various embodiments, needle 202 is configured to be centered (e.g., on a center point, on a central axis, etc.) within body 204. Body 204 defines a first body bore 206 which is configured to receive needle 202. In one embodiment, first body bore 206 is centered (e.g., on a center point, on a central axis, etc.) in needle 202 and is therefore also centered in body 204. Needle 202 is movable within first body bore 206 and therefore moveable relative to body 204 between a first position, where fluid is not provided from the supply to the target, and a second position, where fluid is provided from the supply to the target. In operation, needle 202 oscillates between the first position and the second position. For example, needle 202 may continuously oscillate between the first position and the second position while an internal combustion engine is operational.

Body 204 has a first (e.g., top, etc.) end 208 and a second (e.g., bottom, etc.) end 210. Second end 210 is proximate to the target such the fluid may be provided through second end 210 to the target. Body 204 also defines a second body bore 212 which is coaxial with first body bore 206. Second body bore 212 is contiguous with second end 210. According to various embodiments, first body bore 206 is defined by a first length, and second body bore 212 is defined by a second length less than the first length. First body bore 206 is defined by a first diameter, and second body bore 212 is defined by a second diameter greater than the first diameter. Due to the difference in diameter between second body bore 212 and first body bore 206, body 204 defines a face 214 therebetween. According to various embodiments, face 214 is orthogonal to the central axis of needle 202. In other embodiments, face 214 may be angled, curved, or otherwise shaped relative to the central axis of needle 202.

Second body bore 212 is configured to receive a swirl plate 216 and a tip 218. Swirl plate 216 is configured to provide rotational energy (e.g., swirl, etc.) to the fluid. By providing rotational energy to the fluid, a droplet size of the fluid (e.g., slug, etc.) can be reduced. Because of the design of swirl plate 216, undesirable forces on needle 202 are reduced, reducing wear and tear on a spring in injector 200 and improving design and performance of the spring. This reduction is particularly advantageous at the start of injection (SOI). Additionally, the rotational energy may provide cooling to injector 200, specifically at tip 218, which is particularly advantageous for DEF applications. Tip 218 is configured to selectively provide (e.g., spray, dose, inject, etc.) fluid to the target. According to various embodiments, swirl plate 216 is maintained between face 214 and tip 218 such that an outer face 220 of tip 218 is substantially coplanar with second end 210. In various embodiments, swirl plate 216 has a diameter that is greater than the diameter of first body bore 206 and less than (e.g., slightly less than, etc.) the diameter of second body bore 212. The difference in diameter between second body bore 212 and swirl plate 216 defines a gap 217. Gap 217 is configured to facilitate the flow of fluid around swirl plate 216. Similarly, in an exemplary embodiment, tip 218 has a diameter that is substantially equal to the diameter of second body bore 212. For example, tip 218 may be fit (e.g., press fit, snap fit, interference fit, etc.) into second body bore 212. In other examples, tip 218 may be adhered within second body bore 212 (e.g., through the use of adhesive, through bonding, through welding, etc.). In these ways, fluid leakage between tip 218 and second body bore 212 may be mitigated and/or substantially prevented.

Tip 218 defines an injecting bore 222 (also referred to as a tip bore). In operation, fluid is propelled from injector 200 through injecting bore 222. Injecting bore 222 may be, for example, a straight bore, an angle bore, or other similar bore. Injector 200 also includes an outer shell 224. Outer shell 224 is configured to contain body 204 and needle 202. In application, outer shell 224 may serve as a mounting and/or connecting interface between injector 200 and a surrounding structure and/or electrical system. For example, outer shell 224 may be secured to an injector housing.

Injector 200 also includes a conduit (e.g., pipe, etc.) 226 and a biasing element 228. In some applications, biasing element 228 is a spring. According to various embodiments, biasing element 228 is in confronting relation with both conduit 226 and needle 202 such that movement of needle 202 between the first position and the second position is impacted by (e.g., influenced by, etc.) biasing element 228. Conduit 226 and biasing element 228 define a fluid channel 230. Fluid channel 230 is configured to receive fluid from the supply and to provide the fluid to needle 202.

Needle 202 includes an inlet 232 (also referred to as a first needle inlet) and at least one branch 234. In an exemplary embodiment, needle 202 includes two branches 234. Branch 234 is in fluid communication with inlet 232, and inlet 232 is in fluid communication with fluid channel 230. In this way, fluid can selectively flow through conduit 226, biasing element 228, inlet 232, and branch 234. After flowing through branch 234, fluid flows between needle 202 and first body bore 206, through gap 207, and then between swirl plate 216 and second body bore 212, due to the difference between the diameter of swirl plate 216 and the diameter of second body bore 212. In some embodiments, swirl plate 216 includes a number of flats (e.g., sides, etc.) disposed along the circumference of swirl plate 216, thus forming gaps between the flats and the diameter of second body bore 212.

Figure 4:
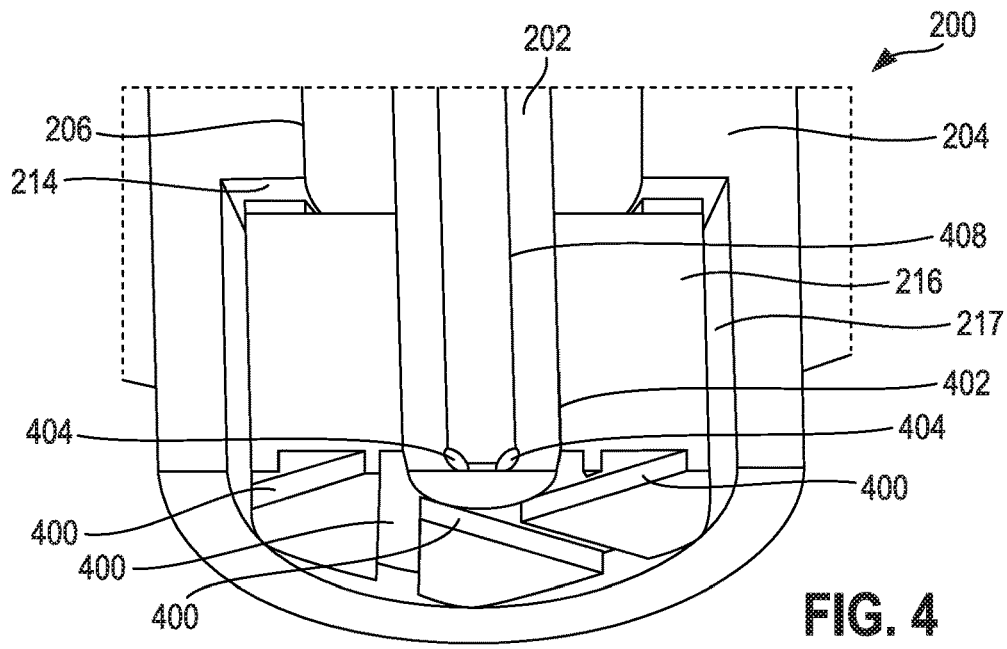
FIG. 4 is a bottom perspective, cross-sectional view of the injector shown in FIG. 3 taken about line B-B.
Figure 5:
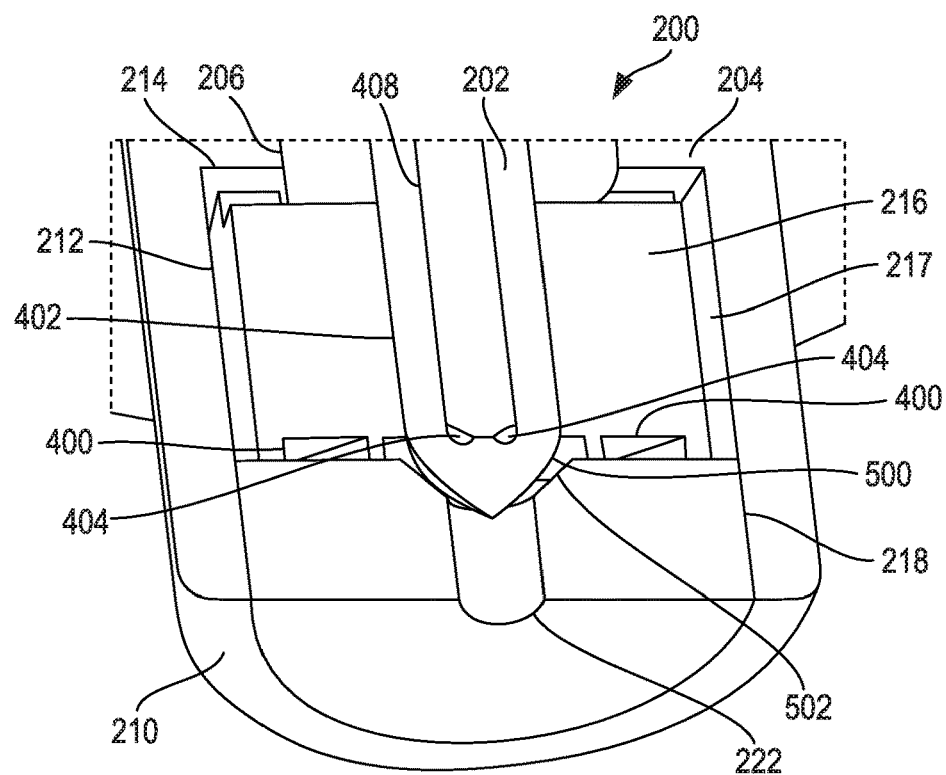
FIG. 5 is a bottom, perspective view of the injector shown in FIG. 3.
Figure 6:
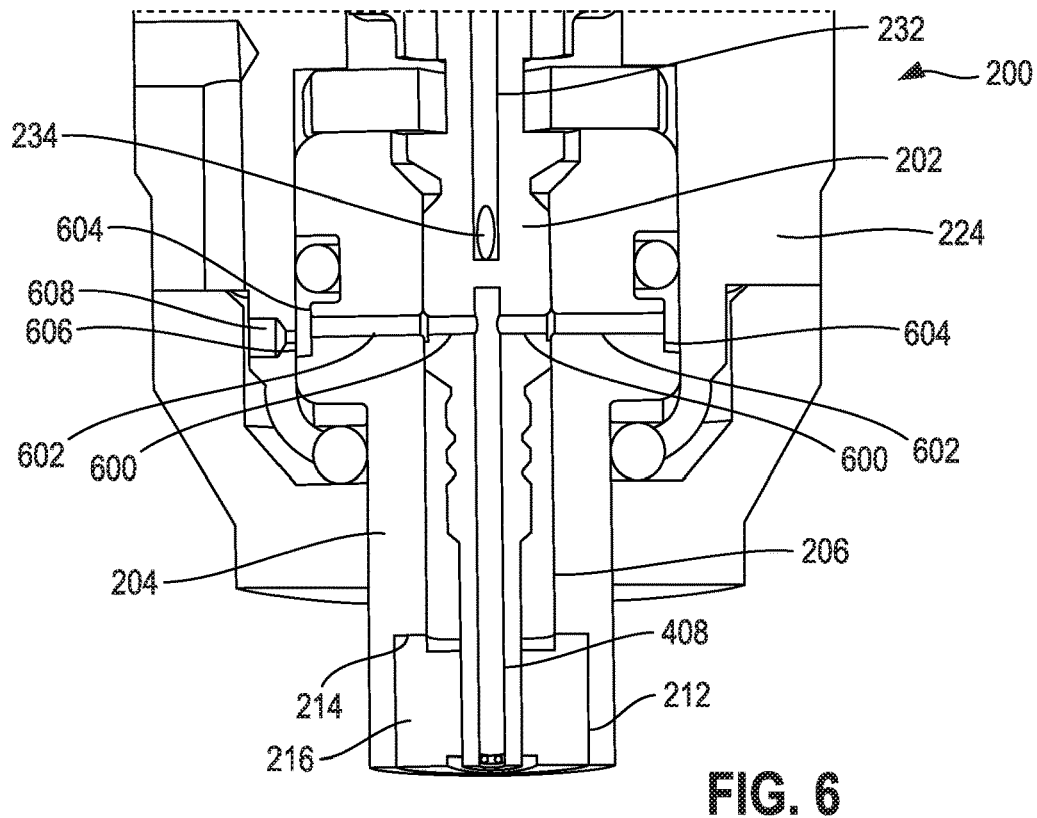
FIG. 6 is a cross-sectional view of the injector shown in FIG. 3 taken about line A-A.

As shown in, FIGS. 4 and 5, for example, swirl plate 216 includes a number of inlet channels 400 and an inner bore 402 (also referred to as a swirl plate bore). In one embodiment, swirl plate 216 includes eight inlet channels 400. However, swirl plate 216 may include one, two, three, four, or any number of inlet channels 400 such that injector 200 is tailored for a target application. According to an exemplary embodiment, inlet channels 400 are configured to facilitate the formation of rotational energy in fluid. For example, inlet channels 400 may be arranged such that fluid flowing from each inlet channel 400 causes rotation of fluid from another inlet channel 400.

Inner bore 402 has a diameter that is slightly larger than the diameter of needle 202 such that movement of needle 202 between the first position and the second position is not substantially impeded while fluid leakage is substantially mitigated. Inlet channels 400 are configured to facilitate selective fluid communication from fluid that is between swirl plate 216 and second body bore 212, with injecting bore 222 depending on the relative position of needle 202. Similarly, needle 202 includes a connector 404 configured to facilitate selective fluid communication between fluid flowing from inlet channels 400 and an outlet bore 408 (also referred to as a second needle bore), depending on the relative position of needle 202. Needle 202 may include one, two, three, four, or more connectors 404. Each connector 404 may be, for example, a straight bore, an angled bore, or other similar bore.

According to an exemplary operation, when needle 202 is in the first position, a head 500 of needle 202 is in contact (e.g., interfaces with, is in confronting relationship with, etc.) with a chamfer 502 in injecting bore 222. The interface between head 500 and injecting bore 222 is configured to substantially prevent leakage of fluid from inlet channels 400 to injecting bore 222 when needle 202 is in the first position. According to various embodiments, chamfer 502 is a counter-sink of injecting bore 222 configured to match head 500. Alternatively, head 500 may be defined by a shape configured to substantially compliment chamfer 502. When needle 202 is in the first position, fluid is routed through connector 404 to outlet bore 408.

Following the exemplary operation, when needle 202 is not in the first position, head 500 of needle 202 is not in contact with chamfer 502, as shown in FIG. 5. When needle 202 is in the second position, fluid is provided from inlet channels 400 to injecting bore 222 and to the target. In some embodiments, fluid is provided to both outlet bore 408 and injecting bore 222 when needle 202 is in the second position. In other embodiments, fluid is substantially prevented from flowing into outlet bore 408 when needle 202 is in the second position. For example, when needle 202 is in the second position, connector 404 may be substantially covered (e.g., blocked, sealed, etc.) by inner bore 402.

Still following the exemplary operation, fluid is selectively provided from outlet bore 408 to branches 600 in needle 202. According to an exemplary embodiment, needle 202 includes two branches 600 such that branches 600 are aligned and substantially orthogonal to outlet bore 408. Body 204 includes connectors 602 which are configured to be in selective fluid communication with outlet bore 408 via branches 600, depending on the relative position of needle 202. In various embodiments, body 204 includes two connectors 602 such that each connector is aligned with one of two branches 600. According to the exemplary operation, fluid is provided from outlet bore 408 through branches 600 to connectors 602 when needle 202 is in the first position. In some embodiments, fluid is provided to connectors 602 when needle 202 is proximate to the first position (e.g., as needle 202 is approaching the first position, as needle 202 is leaving the first position, etc.). In some embodiments, the fluid is continuously provided from outlet bore 408 to branches 600 in needle 202.

According to various embodiments, body 204 includes an annular recess 604 proximate to connectors 602. Annular recess 604 defines a gap 606 between body 204 and outer shell 224. Fluid flowing from connectors 602 is provided to gap 606. Outer shell 224 includes a fluid return passage 608. Fluid return passage 608 is configured to receive fluid from gap 606 and to provide that fluid to the supply. In some embodiments, outer shell 224 includes two, three, or more fluid return passages 608. As fluid enters fluid return passage 608, the fluid may experience a pressure drop (e.g., through an orifice, etc.).

IV. Second Example Injector

Referring now to FIGS. 7A-16, various configurations of an injector 700, and components thereof, are shown. Like injector 200, injector 700 is implemented to receive fluid from a supply and to provide the fluid to a target. Injector 700 includes an inlet fitting 702 and an outlet fitting 704. Inlet fitting 702 is configured to receive fluid from a supply. Outlet fitting 704 is configured to provide the fluid to the supply. Inlet fitting 702 and outlet fitting 704 are configured to interface with various conduits, hoses, and connections. For example, inlet fitting 702 and outlet fitting 704 may facilitate connection with fluid lines.

Figure 8A:
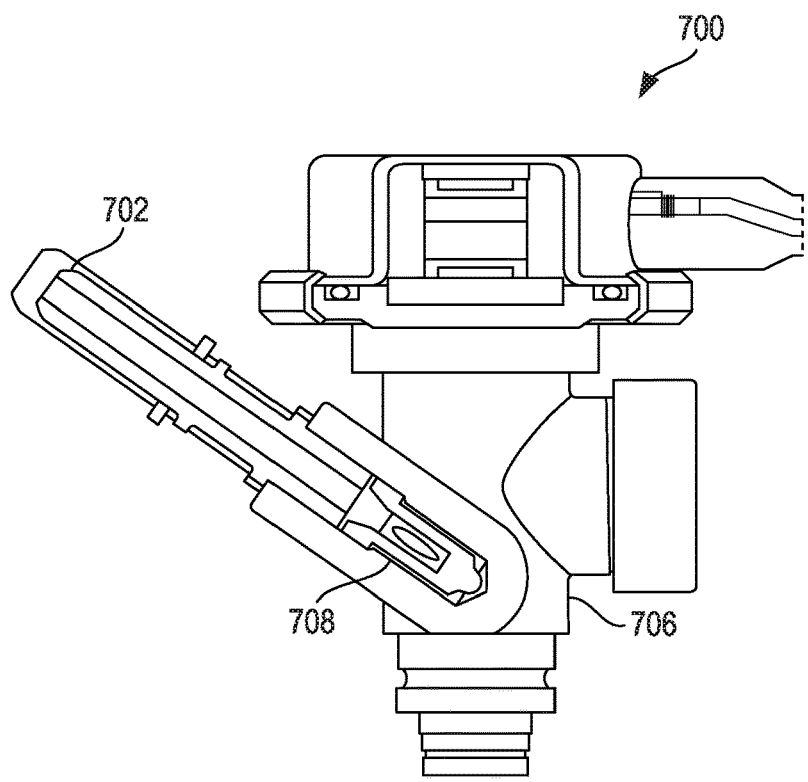
FIG. 8A is a cross-sectional view of the injector shown in FIG. 7A about line C-C.
Figure 8B:
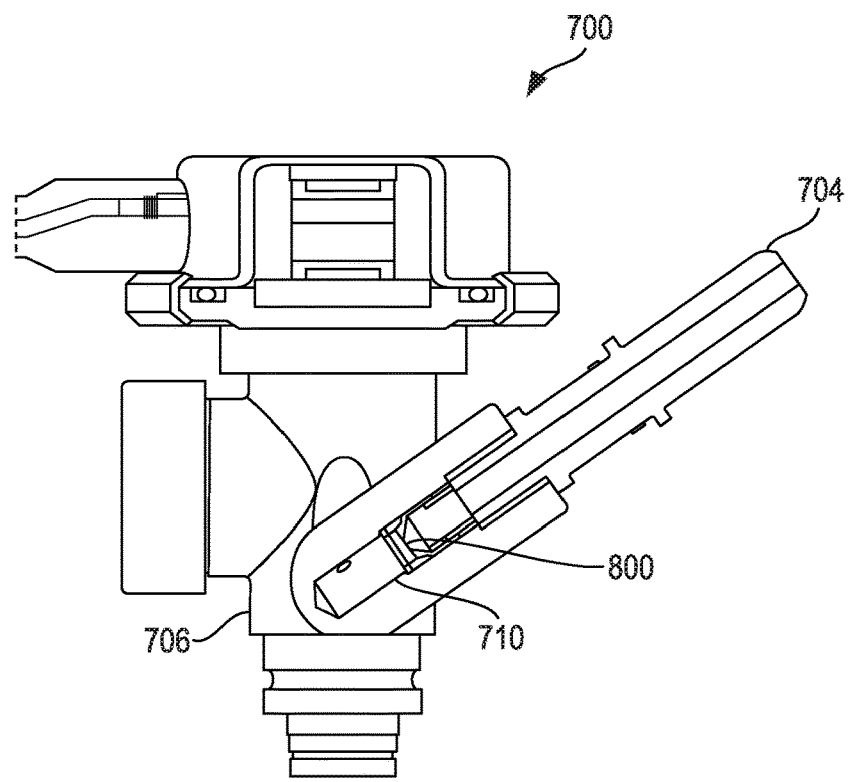
FIG. 8B is a cross-sectional view of the injector shown in FIG. 7A about line D-D.
Figure 9:
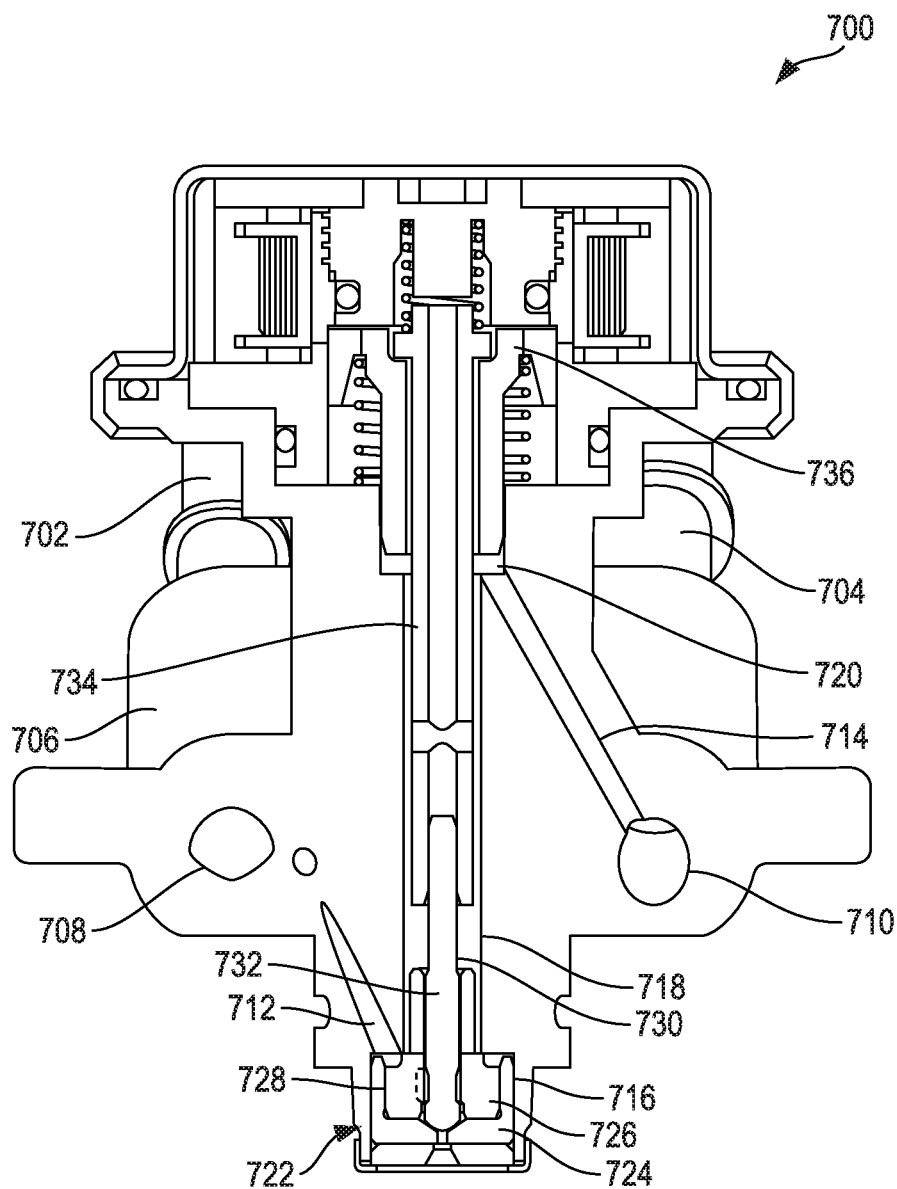
FIG. 9 is a cross-sectional view of the injector shown in FIG. 7A about line E-E.

Injector 700 includes an outer shell 706. Outer shell 706 is similar to outer shell 224 of injector 200 in that outer shell 706 may facilitate mounting and coupling of injector 700 in various systems and locations. Outer shell 706 includes an inlet port (e.g., bore, drilling, etc.) 708 and an outlet port 710. Inlet port 708 is configured to receive inlet fitting 702, and outlet port 710 is configured to receive outlet fitting 704. Inlet port 708 receives fluid from inlet fitting 702, while outlet fitting 704 receives fluid from outlet port 710. According to various embodiments, outlet fitting 704 includes a screen 800, as shown in FIG. 8B. Screen 800 may filter the fluid before it is provided to outlet fitting 704.

Outer shell 706 also includes an inlet passage 712 and an outlet passage 714. Inlet passage 712 is in fluid communication with inlet port 708 and outlet passage 714 is in fluid communication with outlet port 710. Outer shell 706 also includes an inlet bore 716, a central bore 718, and an outlet bore 720. Inlet passage 712 provides fluid from inlet port 708 to inlet bore 716. Outlet bore 720 provides fluid to outlet port 710 through outlet passage 714. Inlet bore 716 is positioned at a first end of central bore 718, and outlet bore 720 is positioned at a second end of central bore 718 opposite inlet bore 716. According to various embodiments, central bore 718 is defined by a first diameter, inlet bore 716 is defined by a second diameter greater than the first diameter, and outlet bore 720 is defined by a third diameter greater than the first diameter.

According to various embodiments, injector 700 also includes a swirl device 722 which includes a swirl plate 724 and a swirl insert 726. Swirl device 722 is configured to receive the fluid from inlet port 708 in inlet bore 716, and to provide the fluid to central bore 718. As will be explained in further detail below, swirl device 722 is configured to provide (e.g., charge, etc.) the fluid with rotational energy (e.g., swirl, etc.). As described for injector 200, this rotational energy provides numerous advantages for injector 700. Specifically, the rotational energy reduces initial (i.e., at SOI) droplet size of the fluid (e.g., slug, etc.). Additionally, the rotational energy does not substantially impact spring/coil design and performance because, for example, injector 700 is pressure-balanced. Injector 700 may reduce pumping quantity requirement (e.g., the amount of fluid provided to injector 700, etc.), which may lower a required pump size for injector 700. Swirl plate 724 is contained within inlet bore 716, while swirl insert 726 is partially contained in both inlet bore 716 and central bore 718. Swirl plate 724 includes and defines a recess 728 within which swirl insert 726 is received. Swirl insert 726 includes a central opening 730. According to various embodiments, central opening 730 is coaxial with inlet bore 716 and central bore 718.

Injector 700 also includes a plunger 732, a connecting element 734, and an armature 736. Plunger 732 is slidably received in central opening 730 such that plunger 732 moves between a first position, where fluid is prevented from being provided to the target, and a second position, where fluid is not prevented from being provided to the target. Plunger 732 extends through central opening 730 into both central opening 730. In the first position, plunger 732 contacts swirl plate 724. Plunger 732 is coupled to connecting element 734. For example, plunger 732 may be fit (e.g., snap fit, press fit, interference fit, etc.) into connecting element 734. Similarly, plunger 732 may be adhered (e.g., glued, fused, welded, etc.) to connecting element 734.

Connecting element 734 is received in central bore 718 and outlet bore 720. Connecting element 734 is defined by a diameter that is less than the diameter of central bore 718 and less than a diameter of outlet bore 720. Similar to plunger 732, armature 736 is coupled to connecting element 734 and may be either fit into or adhered to connecting element 734. Armature 736 is configured to transfer electromechanical force from injector 700 (e.g., from an electromechanical element, etc.) to connecting element 734 and thus to plunger 732.

Figure 10:
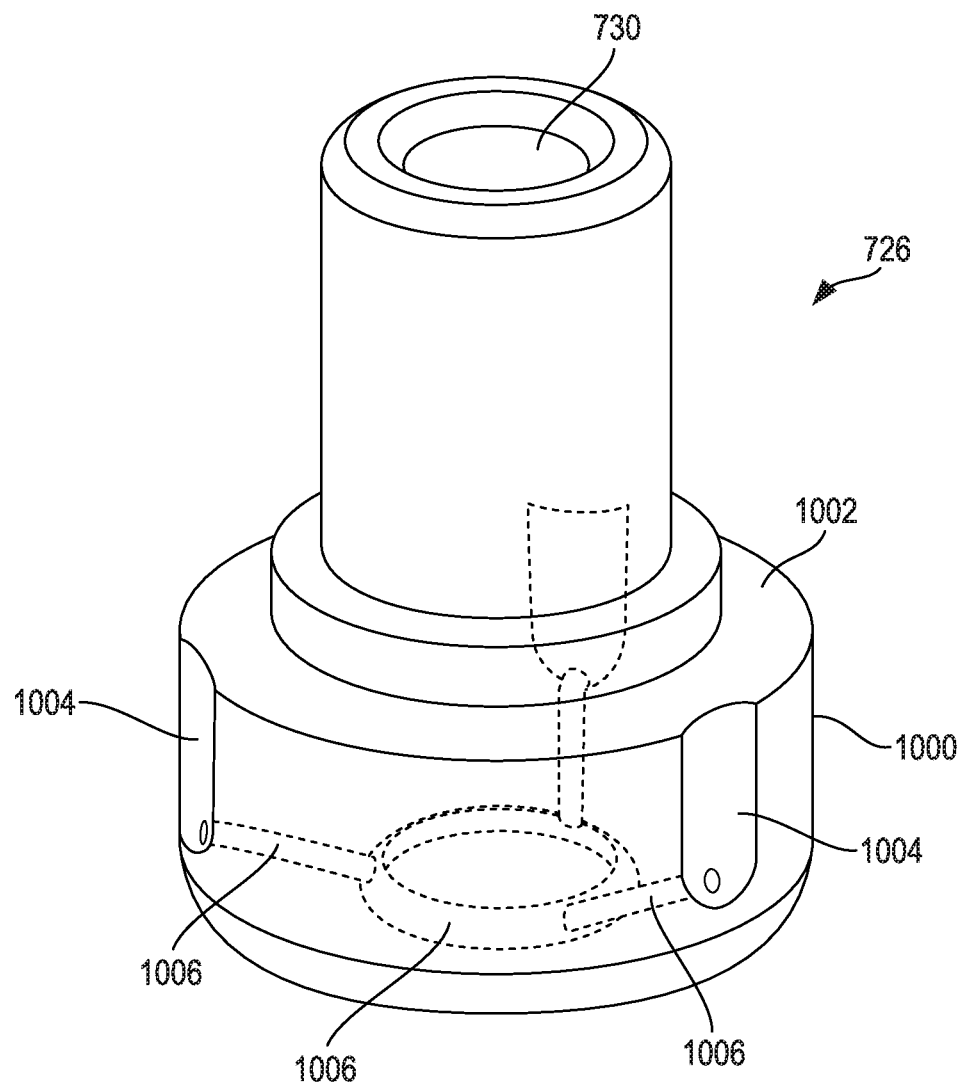
FIG. 10 is a perspective view of a swirl insert for use in the injector shown in FIG. 7A.

Swirl insert 726 is shown in more detail in FIG. 10. Swirl insert 726 includes an exterior surface 1000 and an annular step 1002. Exterior surface 1000 is configured to interface with recess 728. According to various embodiments, exterior surface 1000 is substantially flush with recess 728. Fluid provided into inlet bore 716 interfaces first with annular step 1002. Swirl insert 726 includes at least one collector 1004 along exterior surface 1000 and extending into annular step 1002. For example, swirl insert 726 may include one, two, three, four, or more collectors 1004. Collectors 1004 are inset relative to exterior surface 1000 and provide discontinuities along annular step 1002 such that fluid introduced into inlet bore 716 may be routed into collectors 1004 between exterior surface 1000 and recess 728.

Figure 11:
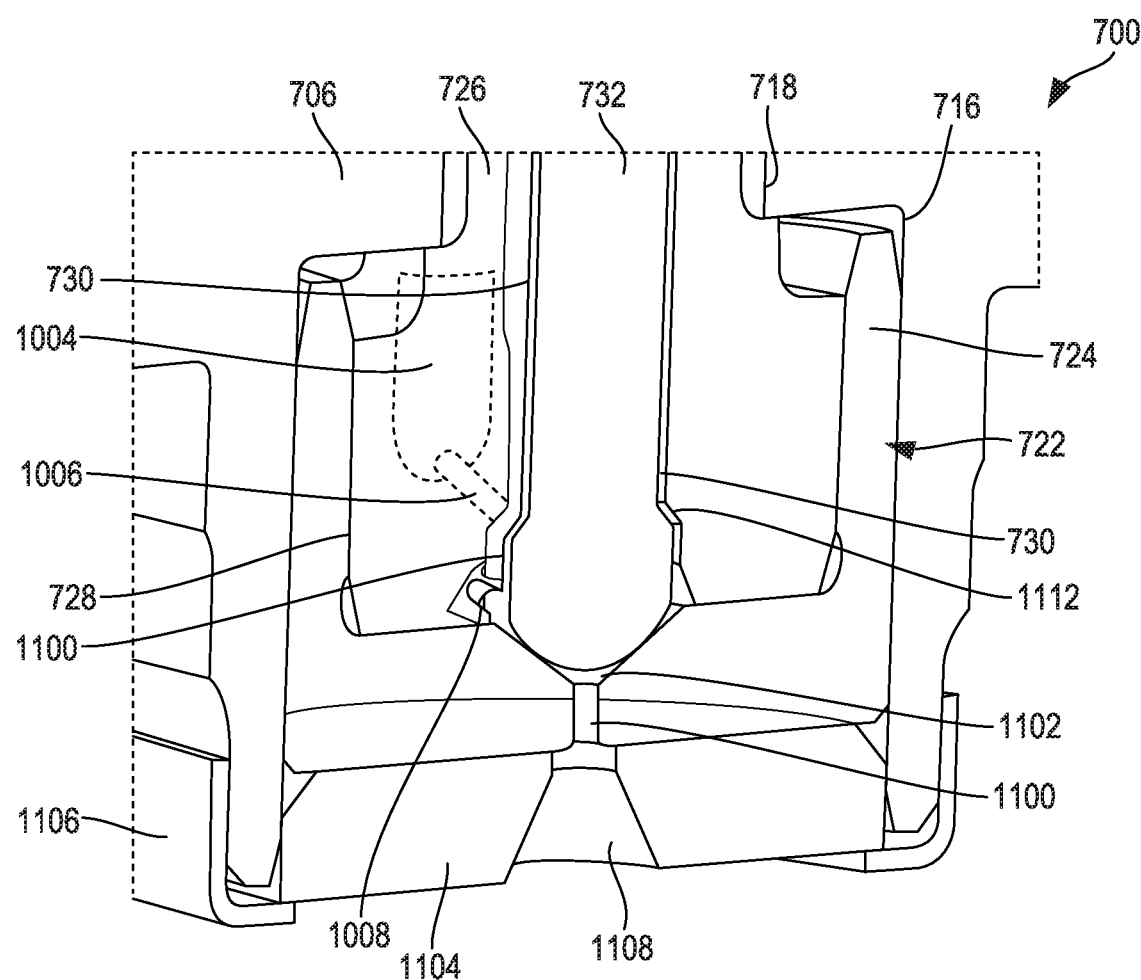
FIG. 11 is a perspective detailed view of the injector shown in FIG. 9.

Swirl insert 726 also includes a number of runners 1006, each having a first end and a second end. Each of runners 1006 is connected on the first end to a single connector 1004 and on a second end to a ring 1008. Runners 1006 are configured to provide fluid contained in collectors 1004 to ring 1008. According to various embodiments, the number of runners 1006 is equal to the number of collectors 1004. Runners 1006 may be drilled into swirl insert 726 at an angle and configured to connect to collectors 1004 proximate to a bottom end of collectors 1004. Ring 1008 is located along an end of central opening 730. As shown in FIG. 11, fluid provided from runners 1006 is located within ring 1008 between central opening 730 and plunger 732.

Still referring to FIG. 11, swirl plate 724 is shown to include an aperture 1100 and a receiver 1102. Receiver 1102 is positioned around aperture 1100. For example, receiver 1102 may be a countersink formed in aperture 1100. Receiver 1102 is configured to selectively interface with plunger 732 when plunger 732 is in the first position such that fluid from ring 1008 is not provided to aperture 1100. However, when plunger 732 is in the second position, fluid from ring 1008 is provided to aperture 1100. Injector 700 also includes a tip 1104. Tip 1104 is in confronting relation with swirl plate 724 and held onto outer shell 706 through the use of a cap 1106. Tip 1104 includes a nozzle 1108. Nozzle 1108 is configured to receive fluid from aperture 1100 and provide the fluid to a target. For example, nozzle 1108 may spray fluid into an exhaust stream. The rotational energy created by swirl device 722 may advantageously provide cooling to tip 1104.

Swirl insert 726 also includes an enlarged opening 1110. Enlarged opening 1110 is contiguous with ring 1008. Enlarged opening 1110 is separated from central opening 730 by an annular surface 1112. Annular surface 1112 is contiguous with both enlarged opening 1110 and central opening 730. According to various embodiments, enlarged opening 1110 is defined by a first diameter, central opening 730 is defined by a second diameter less than the first diameter, and annular surface 1112 is defined by an angle from enlarged opening 1110 that is a function of the difference between the first diameter and the second diameter.

Figure 12:
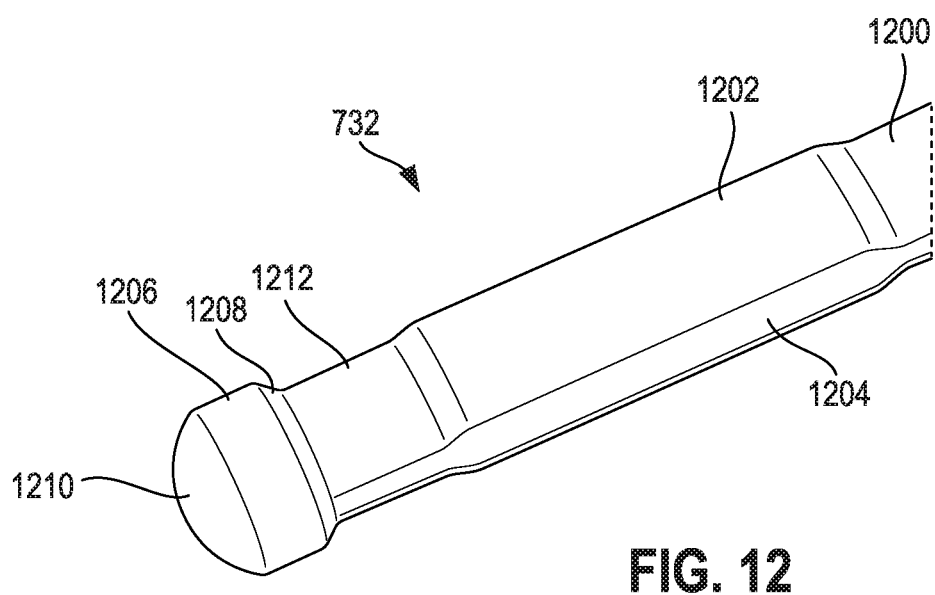
FIG. 12 is a perspective view of a plunger for use in the injector shown in FIG. 7A.

Referring now to FIG. 12, plunger 732 includes a shaft 1200. In application, shaft 1200 is coupled to connecting element 734. For example, shaft 1200 may be received inside shaft 1200 and adhered to or otherwise fixed therein. Plunger 732 also includes sealing surface 1202 and flats 1204. Sealing surface 1202 is configured to interface with central opening 730 in swirl insert 726 such that fluid is substantially prevented from passing between central opening 730 and sealing surface 1202 while facilitating movement of plunger 732 within central opening 730. Flats 1204 provide discontinuities along sealing surface 1202. Flats 1204 facilitate a gap between plunger 732 and central opening 730. Fluid may then flow through this gap. Depending on the target application, flats 1204 may be configured to facilitate the flow of a target amount of fluid.

Plunger 732 also includes a head 1206. According to various embodiments, head 1206 is defined by a diameter that is larger than the diameter of central opening 730. Head 1206 is contained within enlarged opening 1110 and has a diameter that is less than the diameter of enlarged opening 1110. In this way, fluid can flow around plunger 732 between enlarged opening 1110 and head 1206. Plunger 732 also includes an interface surface 1208. Interface surface 1208 is contiguous with head 1206. Interface surface 1208 is configured to selectively interface with annular surface 1112 such that fluid is substantially prevented from flowing between interface surface 1208 and annular surface 1112 when plunger 732 is in the second position and such that fluid is not substantially prevented from flowing between interface surface 1208 and annular surface 1112 when plunger 732 is in the first position.

Figure 13:
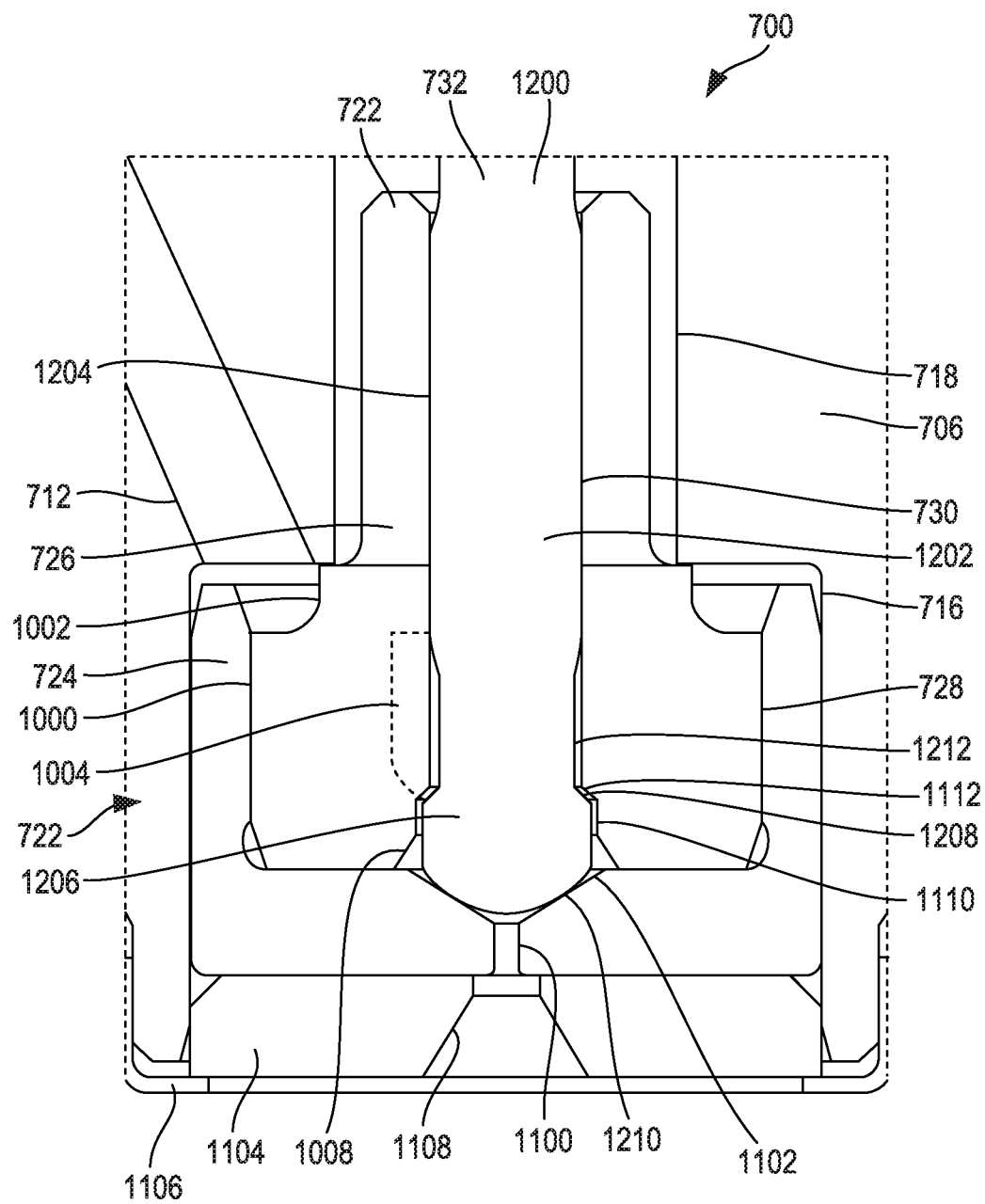
FIG. 13 is a detailed view of the injector shown in FIG. 9.
Figure 14:
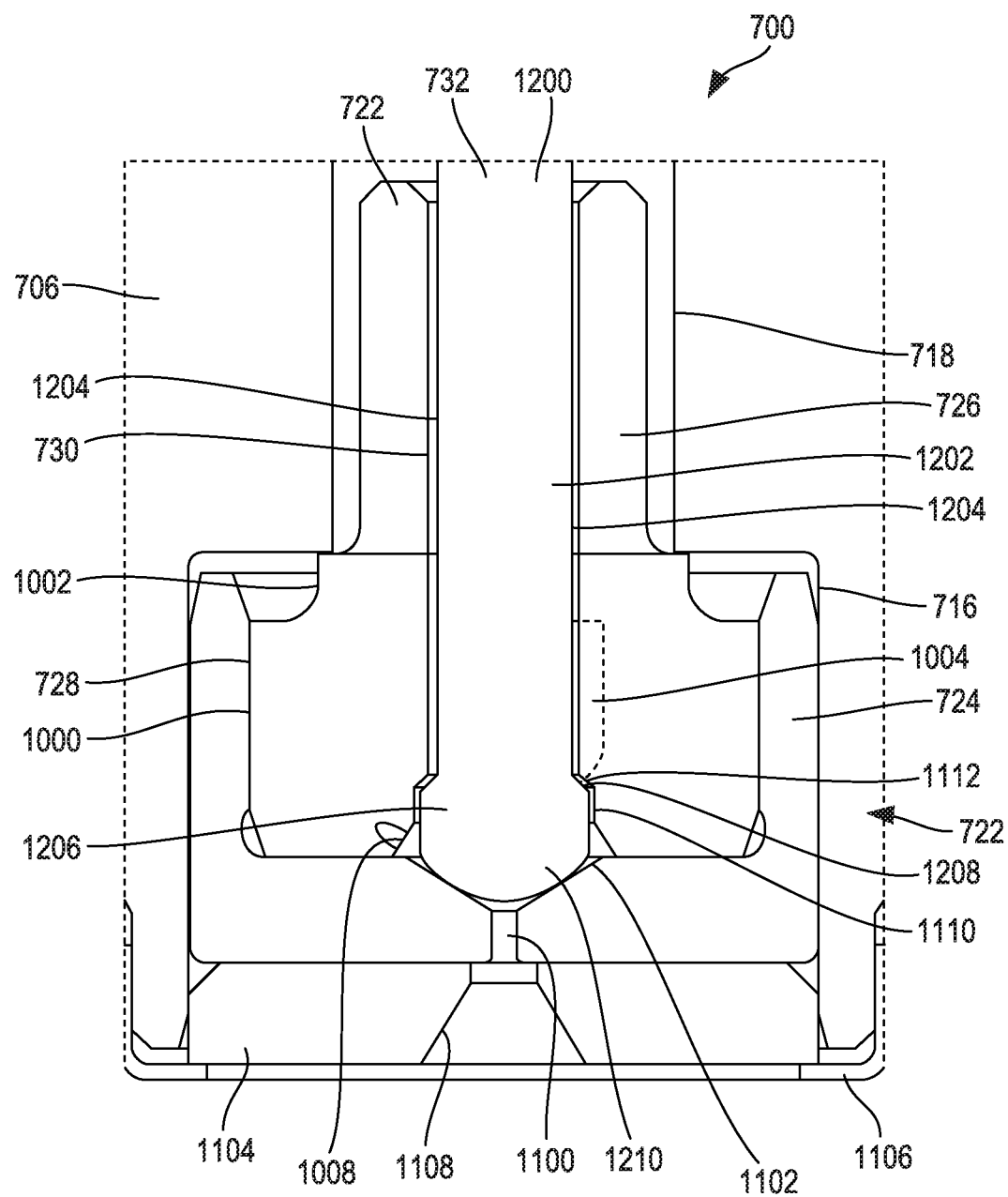
FIG. 14 is a detailed, cross-sectional view of the injector shown in FIG. 7A about line F-F with a plunger in a first position.
Figure 15:
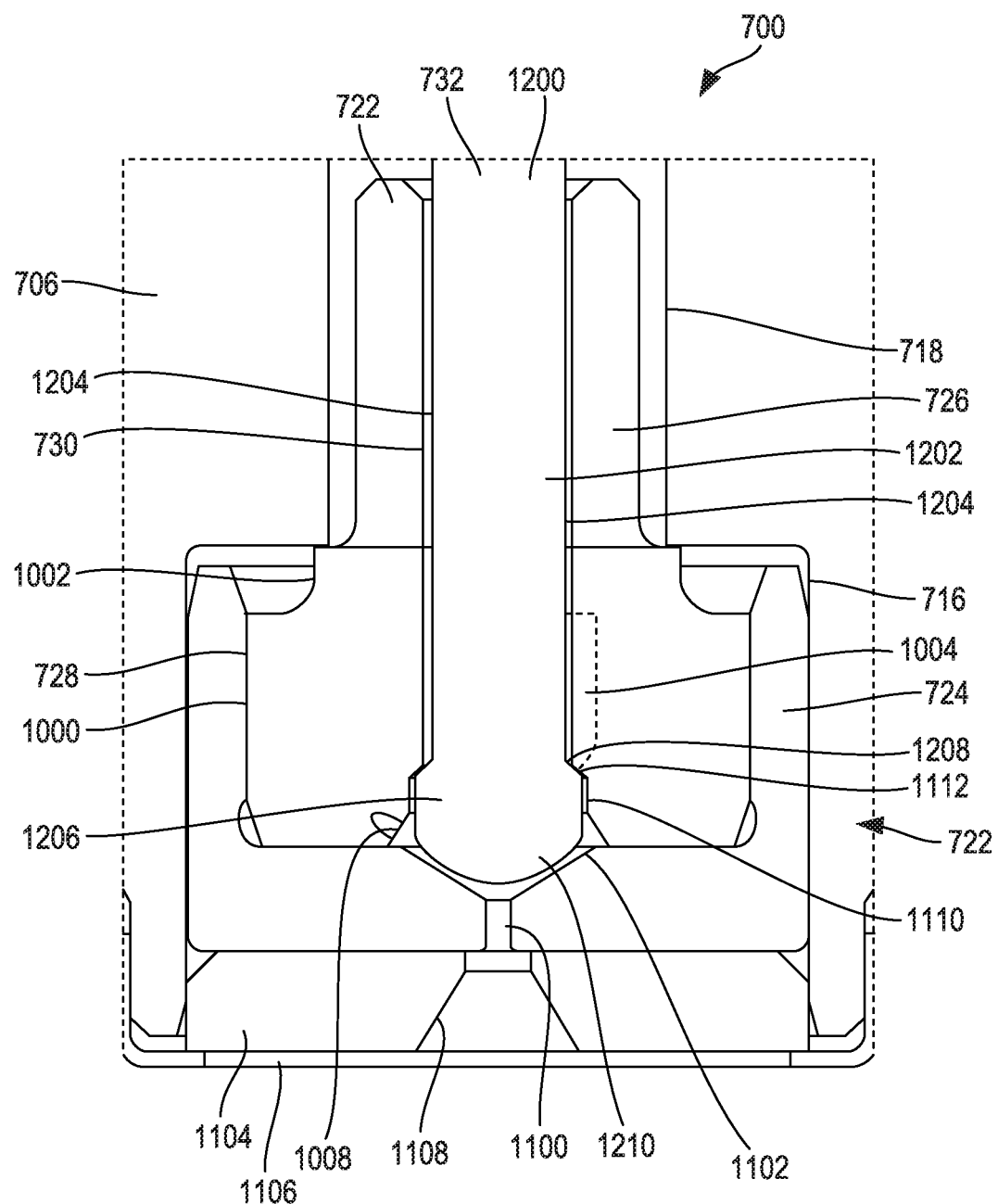
FIG. 15 is a detailed, cross-sectional view of the injector shown in FIG. 7A about line F-F with a plunger in a second position.
Figure 16:
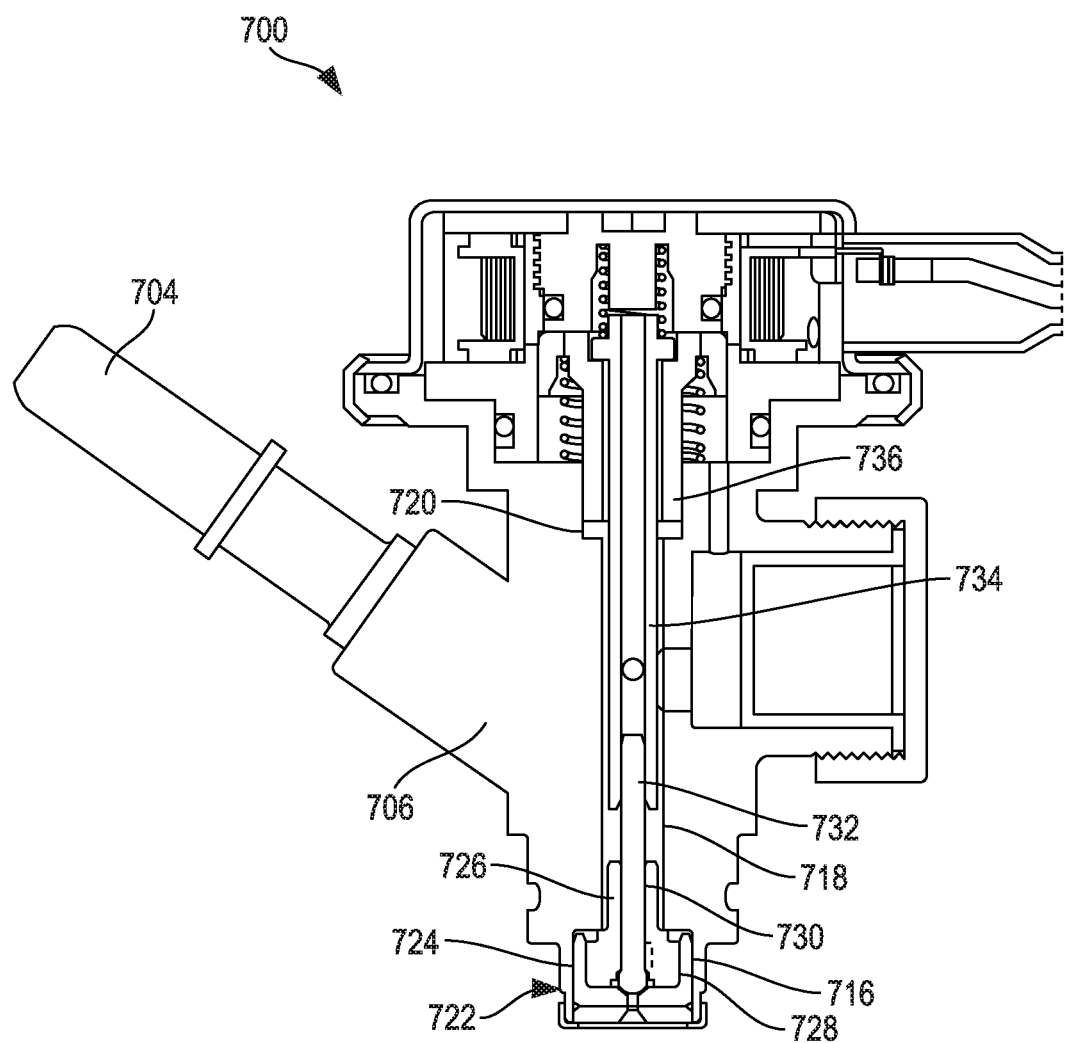
FIG. 16 is a cross-sectional view of the injector shown in FIG. 7A about line C-C.

Plunger 732 also includes a tip 1210. Tip 1210 is contiguous with head 1206. Tip 1210 is configured to selectively interface with receiver 1102 such that fluid is prevented from flowing into aperture 1100 when plunger 732 is in the first position, as shown in FIGS. 13 and 14, and such that fluid is not prevented from flowing into aperture 1100 when plunger 732 is in the second position, as shown in FIG. 15. According to various embodiments, tip 1210 is rounded. However, tip 1210 may also be flat, angled, or otherwise shaped. In other embodiments, tip 1210 is configured to deform upon impacting receiver 1102. For example, plunger 732 may be constructed from resilient material (e.g., rubber, polymer, polymeric compounds, etc.).

In some embodiments, plunger 732 also includes a lower shaft 1212. Lower shaft 1212 is contiguous with interface surface 1208, shaft 1200, and flats 1204. Lower shaft 1212 has a diameter that is less than the diameter of head 1206 and less than the diameter of shaft 1200. Fluid may flow between lower shaft 1212 and central opening 730. In some alternative embodiments, plunger 732 does not include lower shaft 1212. In these embodiments, head 1206 has a diameter greater than the diameter of shaft 1200, and interface surface 1208 is contiguous with shaft 1200 and flats 1204.

Following an exemplary operation, fluid is introduced into injector 700 through inlet fitting 702 and then through inlet port 708. From inlet port 708, fluid flows into inlet passage 712 where the fluid is introduced to inlet bore 716. Fluid flows into annular step 1002 and down into collectors 1004, between exterior surface 1000 of swirl insert 726 and recess 728 of swirl plate 724. From collectors 1004, fluid is directed through runners 1006 to ring 1008. Once in ring 1008, fluid is located proximate to head 1206 of plunger 732. When plunger 732 is in the first position, as determined through the electromagnetic force exerted on armature 736 which is transferred through connecting element 734 to plunger 732, the fluid is blocked from entering aperture 1100 and thus cannot be transmitted to the target through nozzle 1108. Rather, the fluid flows from ring 1008, between head 1206 and enlarged opening 1110, and around plunger 732 by flowing between central opening 730 and flats 1204. Next, while plunger 732 is in the first position, the fluid flows between connecting element 734 and central bore 718 until the fluid reaches outlet bore 720. From outlet bore 720, the fluid is directed through outlet passage 714 to outlet port 710 and then to outlet fitting 704 where the fluid is provided to, for example, the fluid supply.

Still following the exemplary operation, if plunger 732 is in the second position, as determined through the electromagnetic force exerted on armature 736 which is transferred through connecting element 734 to plunger 732, the fluid is no longer blocked from entering aperture 1100. The fluid flows from ring 1008 to aperture 1100 via receiver 1102. From aperture 1100 the fluid flows into nozzle 1108 where the fluid is dispersed to the target. Fluid is prevented from flowing to outlet fitting 704 when plunger 732 is in the second position through a seal created between interface surface 1208 and annular surface 1112. This reduces the overall flow capacity of the supply pump to injector 700. When in the second position, pressure may be created within injector 700 because of the seal created between interface surface 1208 and annular surface 1112. This pressure may propel the fluid to outlet fitting 704. Because the fluid has a constant flow path either to the fluid supply, when plunger 732 is in the first position, or to the target, when plunger 732 is in the second position, rotational energy (e.g., swirl, etc.) created by swirl device 722 is continuous.

IV. Construction of Exemplary Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used the item can include a portion and/or the entire item unless specifically stated to the contrary.

What is claimed is:

1. An injector comprising:
   a needle configured to receive a fluid from a fluid supply and operable between a first position, in which the fluid is not provided to a target, and a second position, in which the fluid is provided to the target, the needle comprising:
      a first needle bore configured to receive the fluid from the fluid supply,
      a second needle bore aligned with the first needle bore and configured to provide the fluid to the fluid supply,
      a first branch in fluid communication with the second needle bore by the first branch, at least a portion of the first branch extending below the first needle bore, the first branch being configured to facilitate transfer of the fluid out of the needle to the fluid supply, and
      a first connector in fluid communication with the second needle bore; and
   a body comprising:
      an end,
      a first body bore is configured to receive the needle, and
      a second body bore positioned to be contiguous with the end.

2. The injector of claim 1, wherein the needle further comprises a second branch connected to the first needle bore;
   wherein the second branch is configured to facilitate fluid communication between a gap, formed between the first body bore and the needle, and the first needle bore.

3. The injector of claim 1, further comprising a swirl plate contained within the second body bore, the swirl plate configured to form a gap between the swirl plate and the second body bore, the swirl plate comprising:
   a swirl plate bore that receives at least a portion of the needle; and
   a plurality of inlet channels configured to facilitate fluid communication between the gap, formed between the swirl plate and the second body bore, and the first connector in the needle.

4. The injector of claim 3, wherein each of the plurality of inlet channels is offset relative to the needle such that the plurality of inlet channels provide the fluid with rotational energy prior to entering the first connector in the needle.

5. The injector of claim 3, further comprising a tip received in the second body bore, the tip located between the swirl plate and the end of the body, the tip comprising:
   a tip bore configured to facilitate fluid communication between the plurality of inlet channels and the target; and
   a chamfer that interfaces with the needle when the needle is in the first position;
   wherein an interface between the chamfer and the needle substantially prevents flow of the fluid into the first connector in the needle when the needle is in the first position.

6. The injector of claim 5, wherein the tip provides fluid to the target when the needle is not in the first position.

7. The injector of claim 1, wherein the body further comprises a second connector configured to selectively receive fluid from the first branch;
   wherein the second connector receives fluid from the first branch when the needle is proximate the first position.

8. The injector of claim 7, further comprising an outer shell that receives the body;

wherein the body further comprises an annular recess defining a gap, the gap being between the body and the outer shell;

wherein the second connector is in fluid communication with the gap, formed between the body and the outer shell.

9. The injector of claim 8, wherein the outer shell further comprises a passage, the passage configured to provide fluid from the gap, formed between the body and the outer shell, to the fluid supply.

10. An injector comprising:
a needle configured to receive fluid from a fluid supply and operable between a first position, in which the fluid is not provided to a target, and a second position, in which the fluid is provided to the target, the needle comprising:
a first needle bore configured to receive the fluid from the fluid supply,
a second needle bore aligned with the first needle bore and configured to provide the fluid to the fluid supply, and
a first connector in fluid communication with the second needle bore; and
a body comprising:
an end,
a first body bore is configured to receive the needle, and
a second body bore positioned to be contiguous with the end;
wherein at least a first portion of the first needle bore is centered on a first axis;
wherein at least a second portion of the second needle bore is centered on a second axis; and
wherein the second axis is coincident with the first axis.

11. The injector of claim 10, wherein the needle further comprises a first branch connected to the first needle bore;
wherein the first branch is configured to facilitate fluid communication between a gap, formed between the first body bore and the needle, and the first needle bore.

12. The injector of claim 10, further comprising a swirl plate contained within the second body bore, the swirl plate configured to form a gap between the swirl plate and the second body bore, the swirl plate comprising:
a swirl plate bore that receives at least a portion of the needle; and
a plurality of inlet channels configured to facilitate fluid communication between the gap, formed between the swirl plate and the second body bore, and the first connector in the needle.

13. The injector of claim 12, wherein each of the plurality of inlet channels is offset relative to the needle such that the plurality of inlet channels provide the fluid with rotational energy prior to entering the first connector in the needle.

14. The injector of claim 10, wherein the needle further comprises a second branch in fluid communication with the second needle bore;
wherein the second branch is configured to facilitate transfer of the fluid out of the needle.

15. The injector of claim 14, wherein the body further comprises a second connector configured to selectively receive fluid from the second branch;
wherein the second connector receives fluid from the second branch when the needle is proximate the first position.

16. The injector of claim 15, further comprising an outer shell that receives the body;
wherein the body further comprises an annular recess defining a gap, the gap being between the body and the outer shell;
wherein the second connector is in fluid communication with the gap, formed between the body and the outer shell.

17. The injector of claim 16, wherein the outer shell further comprises a passage, the passage configured to provide fluid from the gap, formed between the body and the outer shell, to the fluid supply.

* * * * *